United States Patent
Lu et al.

(10) Patent No.: US 10,460,254 B2
(45) Date of Patent: Oct. 29, 2019

(54) SYSTEM AND METHOD FOR REDUCING STATE SPACE IN REINFORCED LEARNING BY USING DECISION TREE CLASSIFICATION

(71) Applicant: VMware, Inc., Palo Alto, CA (US)

(72) Inventors: Lei Lu, Sunnyvale, CA (US); Pradeep Padala, San Jose, CA (US); Anne Holler, Los Altos, CA (US); Xiaoyun Zhu, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 806 days.

(21) Appl. No.: 14/660,862

(22) Filed: Mar. 17, 2015

(65) Prior Publication Data

US 2016/0275412 A1 Sep. 22, 2016

(51) Int. Cl.
*G06N 3/02* (2006.01)
*G06N 20/00* (2019.01)
*G06F 9/455* (2018.01)
*G06N 5/00* (2006.01)

(52) U.S. Cl.
CPC ......... *G06N 20/00* (2019.01); *G06F 9/45558* (2013.01); *G06N 5/003* (2013.01); *G06F 2009/4557* (2013.01)

(58) Field of Classification Search
CPC ...... G06N 20/00; G06N 5/003; G06N 99/005; G06N 5/045; G06F 9/45558; G06F 2009/4557
See application file for complete search history.

(56) References Cited

U.S. PATENT DOCUMENTS

| | | | | |
|---|---|---|---|---|
| 2012/0089967 A1* | 4/2012 | Varadarajan | .......... | G06F 9/5033 717/136 |
| 2012/0278482 A1* | 11/2012 | Alon | ...................... | H04L 47/10 709/224 |
| 2013/0185729 A1* | 7/2013 | Vasic | .................... | G06F 9/5072 718/104 |
| 2014/0337837 A1 | 11/2014 | Padala et al. | | |

OTHER PUBLICATIONS

Using Reinforcement Learning for Autonomic Resource Allocation in Clouds: Towards a Fully Automated Workflow—2011 Xavier Dutreilhy, Sergey Kirgizov, Olga Melekhova, Jacques Malenfant, Nicolas Rivierrey and Isis Truckz.*

(Continued)

*Primary Examiner* — Kakali Chaki
*Assistant Examiner* — Ababacar Seck
(74) *Attorney, Agent, or Firm* — Loza & Loza, LLP

(57) ABSTRACT

An automatic scaling system and method for reducing state space in reinforced learning for automatic scaling of a multi-tier application uses a state decision tree that is updated with new states of the multi-tier application. When a new state of the multi-tier application is received, the new state is placed in an existing node of the state decision tree only if a first attribute of the new state is same as a first attribute of any state contained in the existing node and a second attribute of the new state is sufficiently similar to a second attribute of each existing state contained in the existing node based on a similarity measurement of the second attribute of each state contained in the existing node with the second attribute of the new state.

22 Claims, 7 Drawing Sheets

(56) References Cited

OTHER PUBLICATIONS

Reinforcement Learning with Decision Trees—2003 Larry D. Pyeatt.*
Multi-Dimensional Optimization for Cloud Based Multi-Tier Applications—2010 Gueyoung Jung.*
Auto-scaling Techniques for Elastic Applications in Cloud Environments—2012 Tania Lorido-Botran, Jose Miguel-Alonso, Jose A. Lozano.*
Multi-Tier Internet Service Management : Statistical Learning Approaches—2013 by Sireesha Muppala.*
CloudScale: Elastic Resource Scaling for Multi-Tenant Cloud Systems—2011 Zhiming Shen, Sethuraman Subbiah, Xiaohui Gu, John Wilkes.*

* cited by examiner

SYSTEM AND METHOD FOR REDUCING STATE SPACE IN REINFORCED LEARNING BY USING DECISION TREE CLASSIFICATION

BACKGROUND

A virtual data center is implemented using entities such as physical hosts and storage devices that are connected to each other via one or more networks. Running on the physical hosts are virtual machines, which execute one or more applications. The performance of these applications depends on the number of the entities supporting the virtual data center and their configurations, as well as the workload on the applications. In order to meet service level objectives (SLOs) of the applications, the virtual machines executing the applications need to be able to handle the changing workload on the applications.

Elasticity is an important feature of virtual data centers. Elasticity refers to the ability to scale in or out virtual machines executing the applications to handle changing workload conditions. Typically, a virtual data center provides scaling based on resource usage thresholds set by a user. These thresholds are static values determined, generally, at the initialization of the virtual data center. The thresholds are commonly based on specific resource usage conditions on the virtual machines (e.g., average processor usage>70%), and are set by the user. However, scaling based on virtual machine resource usage is not sufficient to scale applications with multiple tiers. Additionally, these multi-tier applications often have complicated dependencies, further complicating a determination of which tier and resource (CPU, memory, storage etc.) to scale.

One advanced technique to automatically scale multi-tier applications involves using reinforced learning, e.g., Q-learning, in order to make appropriate recommendations for proper scaling of a multi-tier application. This reinforced learning solves the problem of how to ensure that a multi-tier application operates at a desired performance level, e.g., satisfies SLO, by using positive and negative rewards for actions taken from one state to another state, where each state represents a resource configuration and application performance. The rewards for the different states are typically stored in a table. However, since even a very small change in application performance and resource configuration may create a new state, the number of states to consider may quickly become too large to manage, and thus, the rewards table may become intractable.

SUMMARY

An automatic scaling system and method for reducing state space in reinforced learning for automatic scaling of a multi-tier application uses a state decision tree that is updated with new states of the multi-tier application. When a new state of the multi-tier application is received, the new state is placed in an existing node of the state decision tree only if a first attribute of the new state is same as a first attribute of any state contained in the existing node and a second attribute of the new state is sufficiently similar to a second attribute of each existing state contained in the existing node based on a similarity measurement of the second attribute of each state contained in the existing node with the second attribute of the new state.

A method for reducing state space in reinforced learning for automatic scaling of a multi-tier application in accordance with an embodiment of the invention comprises receiving a new state of the multi-tier application to be added to a state decision tree for the multi-tier application, the new state including a first attribute and a second attribute, placing the new state in an existing node of the state decision tree only if the first attribute of the new state is same as the first attribute of any state contained in the existing node and the second attribute of the new state is sufficiently similar to a second attribute of each existing state contained in the existing node based on a similarity measurement of the second attribute of each state contained in the existing node with the second attribute of the new state, and executing the reinforced learning using the state decision tree with the new state to automatically scale the multi-tier application. In some embodiments, the steps of this method are performed when program instructions contained in a computer-readable storage medium is executed by one or more processors An automatic scaling system for automatic scaling of a multi-tier application supported by hardware in a distributed computer system in accordance with an embodiment of the invention comprises a monitoring module, a reinforced learning module and a decision tree classifier module. The monitoring module is configured to collect state information of the multi-tier application. The reinforced learning module is configured to perform reinforced learning using a state decision tree generated using the state information of the multi-tier application. The decision tree classifier module is configured to create and modify the state decision tree for the multi-tier application. The decision tree classifier module is configured to receive a new state of the multi-tier application to be added to a state decision tree for the multi-tier application. The new state includes a first attribute and a second attribute. The decision tree classifier module is configured to place the new state in an existing node of the state decision tree only if the first attribute of the new state is same as the first attribute of any state contained in the existing node and the second attribute of the new state is sufficiently similar to a second attribute of each existing state contained in the existing node based on a similarity measurement of the second attribute of each state contained in the existing node with the second attribute of the new state.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
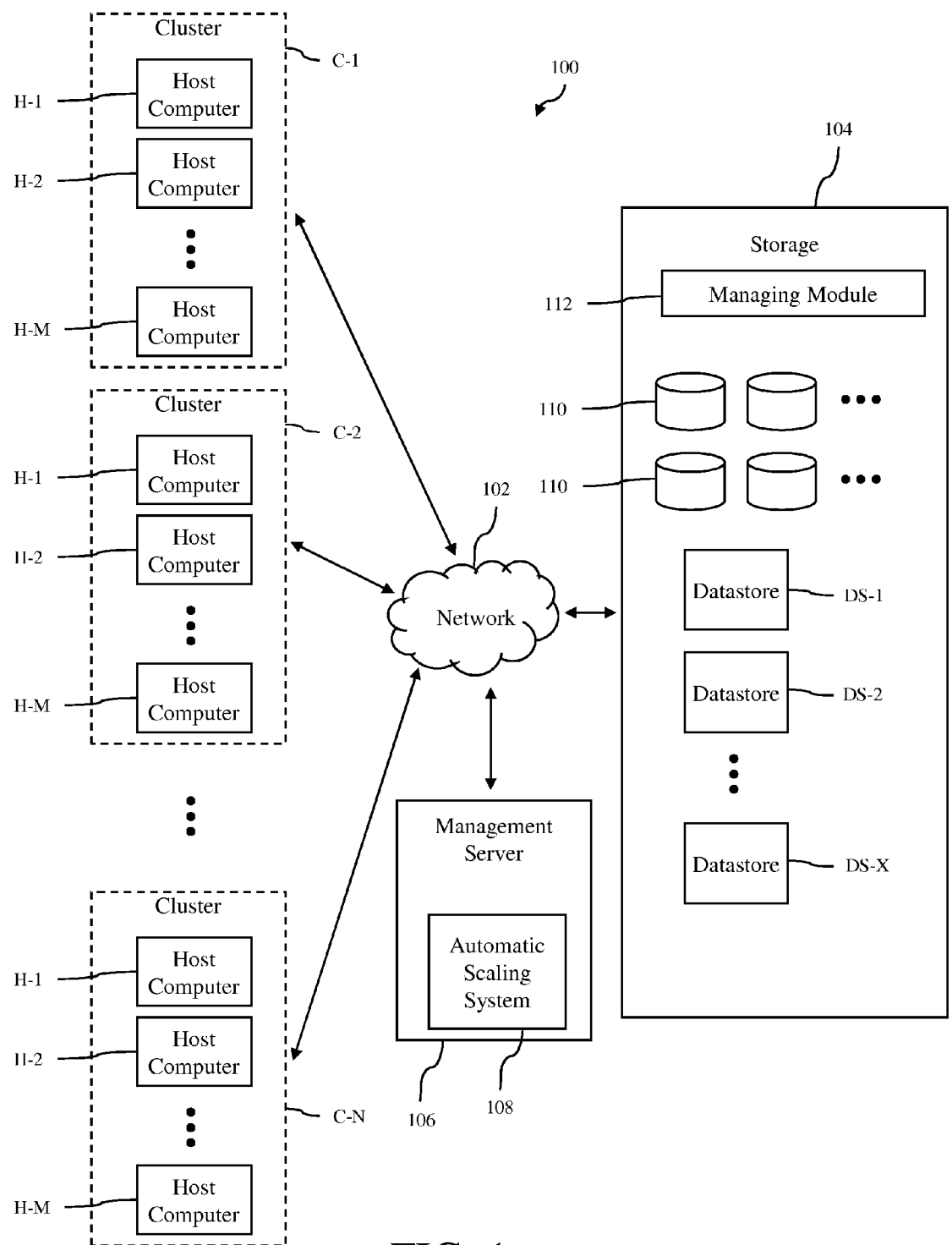
FIG. 1 is a block diagram of a distributed computer system in accordance with an embodiment of the invention.

Turning now to FIG. 1, a distributed computer system 100 that provides a cloud computing environment in accordance with an embodiment of the invention is shown. The distributed computer system may be, for example, a computer network system. As shown in FIG. 1, the distributed computer system includes a network 102, clusters C-1, C-2 . . . C-N of host computers (where N is a positive integer), storage 104 and a management server 106 with an automatic scaling system 108. The exact number of host computer clusters included in the distributed computer system can be any number of clusters from one to tens of clusters or more.

The host computers of the different clusters, the storage and the management server are connected to the network. Thus, each of the host computers in the clusters and the management server are able to access the storage via the network and may share the resources provided by the storage. Consequently, any process running on any of the host computers and the management server may also access the storage via the network.

In the illustrated embodiment, each of the clusters C-1, C-2 . . . C-N includes a number of host computers H-1, H-2 . . . H-M (where M is a positive integer). The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in data centers. As an example, the host computers may be servers installed in one or more server racks. Typically, the host computers of a cluster are located within the same server rack.

Figure 2:
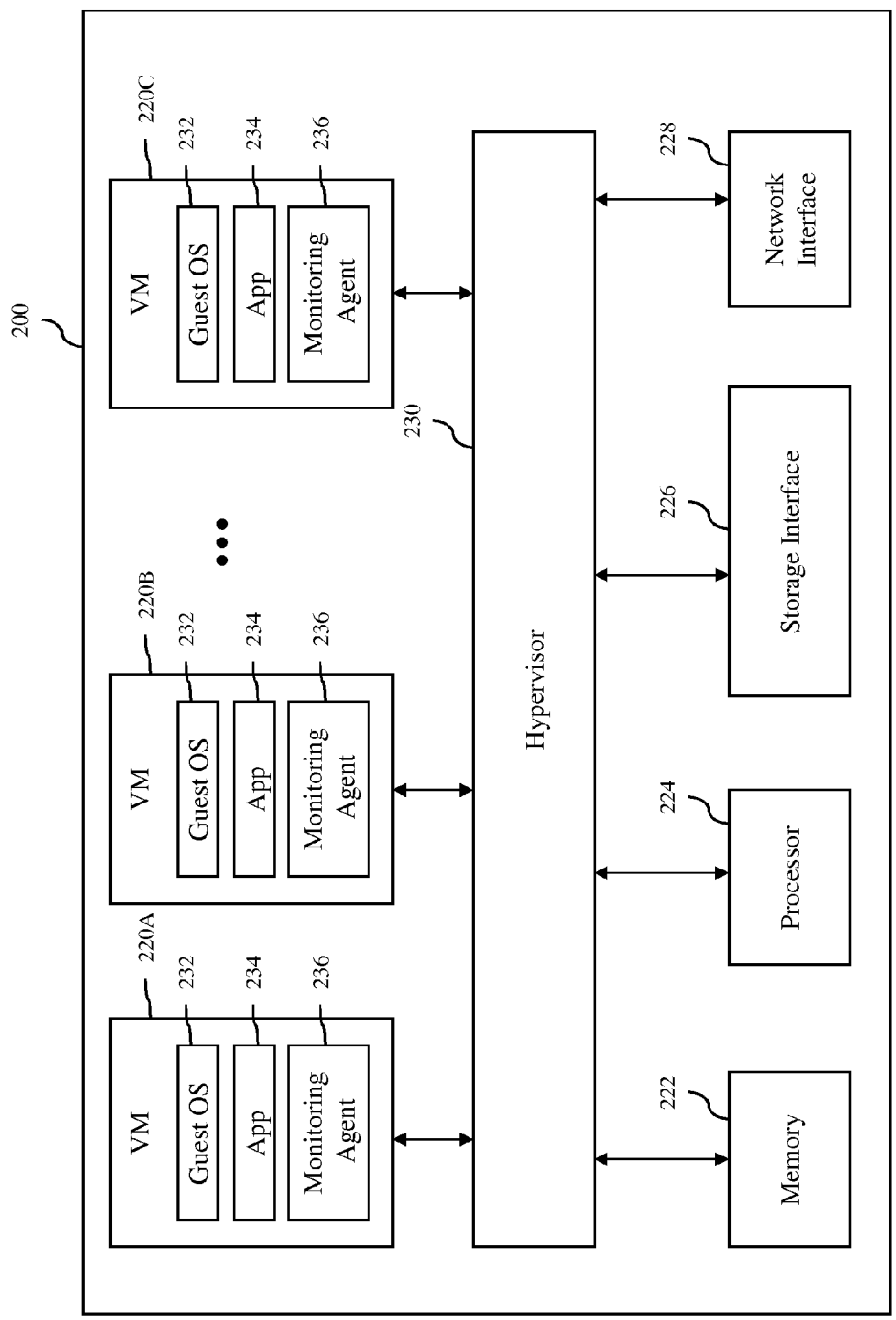
FIG. 2 is a block diagram of a host computer in accordance with an embodiment of the invention.

Turning now to FIG. 2, components of a host computer 200 that is representative of the host computers H-1, H-2 . . . H-M in the clusters C-1, C-2 . . . C-N in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory, which may be random access memory (RAM), is the primary memory of the host computer. The processor can be any type of a processor, such as a central processing unit (CPU) commonly found in a server. The storage interface is an interface that allows that host computer to communicate with the storage 104. As an example, the storage interface may be a host bus adapter or a network file system interface. The network interface is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software.

Each VM may include a guest operating system 232, one or more guest applications 234 and a monitoring agent 236. The guest operating system 232 manages virtual system resources made available to the corresponding VM by the hypervisor 230, and, among other things, the guest operating system forms a software platform on top of which the guest applications 234 run. The monitoring agent is a software program running in the VM to monitor and report resource metrics for that VM to the automatic scaling system 108 in the management server 106. These resource metrics reflect availability, performance, utilization, and throughput for each resource type being monitored, such as CPU, memory, storage and network. In an embodiment, the monitoring agent is a Hyperic Agent that reports to a Hyperic Server, which is included in the automatic scaling system.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer. Thus, the applications 234 and the monitoring agents 236 of the VMs are capable of communicating with other entities connected to the network.

Turning back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M of the clusters C-1, C-2 . . . C-N, which can be accessed like any other storage device connected to computer systems. In an embodiment, the storage can be accessed by entities, such as clients (e.g., VMs) running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 . . . DS-X (where X is an integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. For VMs, the datastores may be used to store virtual storage, e.g., virtual disks, used by each of the VMs, as well as other files needed to support the VMs. One or more datastores may be associated with one or more host computers. Thus, each host computer is associated with at least one datastore. Some of the datastores may be grouped into one or more clusters of datastores, which are commonly referred to as storage pods.

The management server 106 operates to monitor and manage the host computers H-1, H-2 . . . H-M of the clusters C-1, C-2 . . . C-N and/or the storage 104 of the distributed computer system 100. The management server may be configured to monitor the current configurations of the host computers and the clients running on the host computers, for example, VMs. The monitored configurations may include hardware configuration of each of the host computers, such as CPU type and memory size, and/or software configurations of each of the host computers, such as operating system (OS) type and installed applications or software programs. The monitored configurations may also include clustering information, i.e., which host computers are included in which clusters. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource settings, such as limit, reservation, entitlement and share values for various resources, e.g., CPU, memory, network bandwidth and storage, which are consumed by the clients.

The management server 106 may also be configured to monitor the current configuration of the storage 104, including the physical storage devices 110 and the datastores DS-1, DS-2 . . . DS-X of the storage. The monitored storage configuration may include storage device configuration, which may include the number of storage devices in the storage, the device type of the storage devices, such as solid-state devices (SSDs) and hard disks, and storage capacity of each of the storage devices. The monitored storage configuration may also include datastore configuration, such as storage capacity of each of the datastores and connections and associations between the datastores and the host computers H-1, H-2 . . . H-M and/or the clients running on the host computers.

The management server 106 may also be configured to monitor the current usage of resources by the clients, the host computers H-1, H-2 . . . H-M and the clusters C-1, C-2 . . . C-N of host computers. For example, the management server may monitor CPU processing usage, memory usage, network usage and storage usage of the clients. The management server may also be configured to store the usage of resources by the clients, the host computers and the clusters of host computers to maintain historical resource usage information. The historical resource usage information can then be used to develop various resource usage statistics for the individual clients, the individual host computers and the individual clusters of host computers.

The management server 106 may also be configured to perform various operations to manage the clients, the host computers H-1, H-2 . . . H-M, the clusters C-1, C-2 . . . C-N of host computers and the storage 104. As an example, the management server may be configured to initially place new clients onto one or more of the host computers in particular clusters and move existing clients to different host computers and/or different clusters. The management server can assign software processes to the host computer clusters in a manner that balances the loads of the software processes running on the host computer clusters. Processes, such as VMs, can be balanced based on allocation policies, resource demand, and the availability of resources provided by the host computer clusters. Balancing can be applied to computer resources such as processor time, i.e., CPU cycles, memory space, network bandwidth (including any type of input/output or bus bandwidth), storage space, power consumption, cache space, software licenses, and so on. To effectively balance the computing resources, a running VM, for example, can be migrated from one host computer cluster to another, in a process that is known as live VM migration. As another example, the management server may be configured to power down particular clients and/or host computers to conserve power and/or resources.

In order to perform these various operations, the management server 106 may maintain requirements and preferences for the clients with respect to the host computers and the datastores. These requirements and preferences may include affinity or anti-affinity rules for some of the clients, which may be mandatory or preferential. For example, these affinity or anti-affinity rules may include rules that specify which clients should run on the same host computer or be kept on separate host computers. As another example, these affinity or anti-affinity rules may include rules that specify which host computers are acceptable to clients and which host computers are not. The management server may be configured or programmed to perform other operations to manage the distributed computer system 100. The management server may be a physical computer system with at least one processor, memory and other components commonly found in a computer system, such as the host computer 200 shown in FIG. 2. Alternatively, the management server may be a software process executed by one or more processors of a physical computer system. In an implementation, the management server is a VMware® vCenter server ("VMware" and "vCenter" are trademarks of VMware, Inc.) with at least some of the features available for such server.

Figure 3:
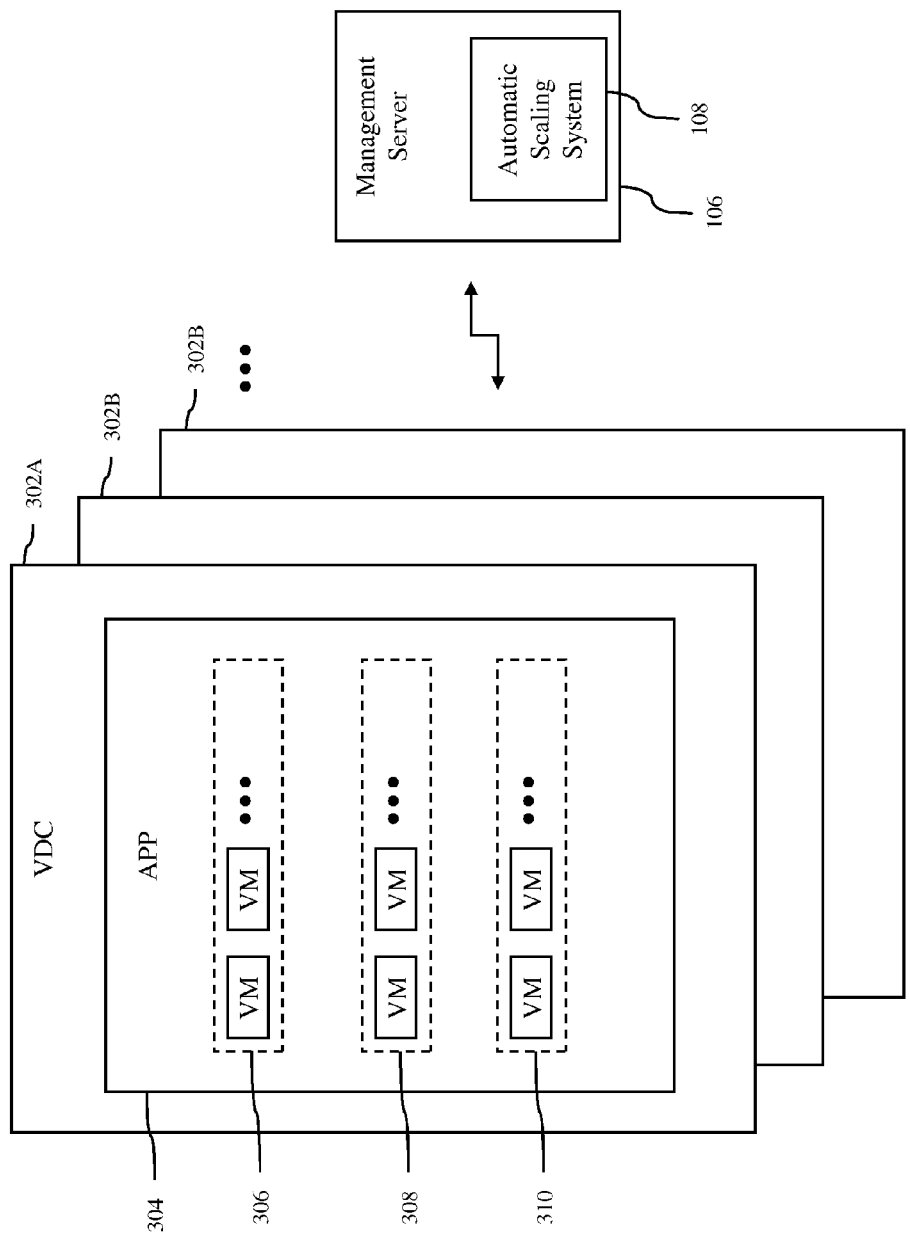
FIG. 3 illustrates virtual data centers that can support one or more multi-tier applications, wherein each tier of the multi-tier application is executed by one or more virtual machines, in accordance with an embodiment of the invention.

As illustrated in FIG. 3, in an embodiment in which clients are VMs, at least some of the VMs running on the host computers H-1, H-2 . . . H-M and at least some of the data stores (not shown in FIG. 3) defined in the storage 104 support one or more virtual data centers 302. Each virtual data center may be configured to host one or more multi-tier applications, which are executed by some of the VMs running on the host computers. Multi-tier applications may utilize the different tiers to perform different functions. As an example, in FIG. 3, a multi-tier application 304 running on the virtual data center 302A is shown to be an application with three tiers 306, 308 and 310. The tier 306 may be configured and designated to perform web server functionality. The tier 308 may be configured and designated to perform application server functionality. The tier 310 may be configured and designated to perform database server functionality. For each tier of the multi-tier application, one or more VMs perform the functionality of that tier. As workload on the different tiers of the multi-tier application changes, the VMs executing the functionalities of the tiers may become over-utilized or under-utilized, which can degrade the performance of the multi-tier application and/or decrease the efficiency of the VMs. As described in more detail below, the automatic scaling system 108 of the management server 106 operates to automatically scale the multi-tier application as needed by adding or deleting VMs executing the multi-tier application.

Figure 4:
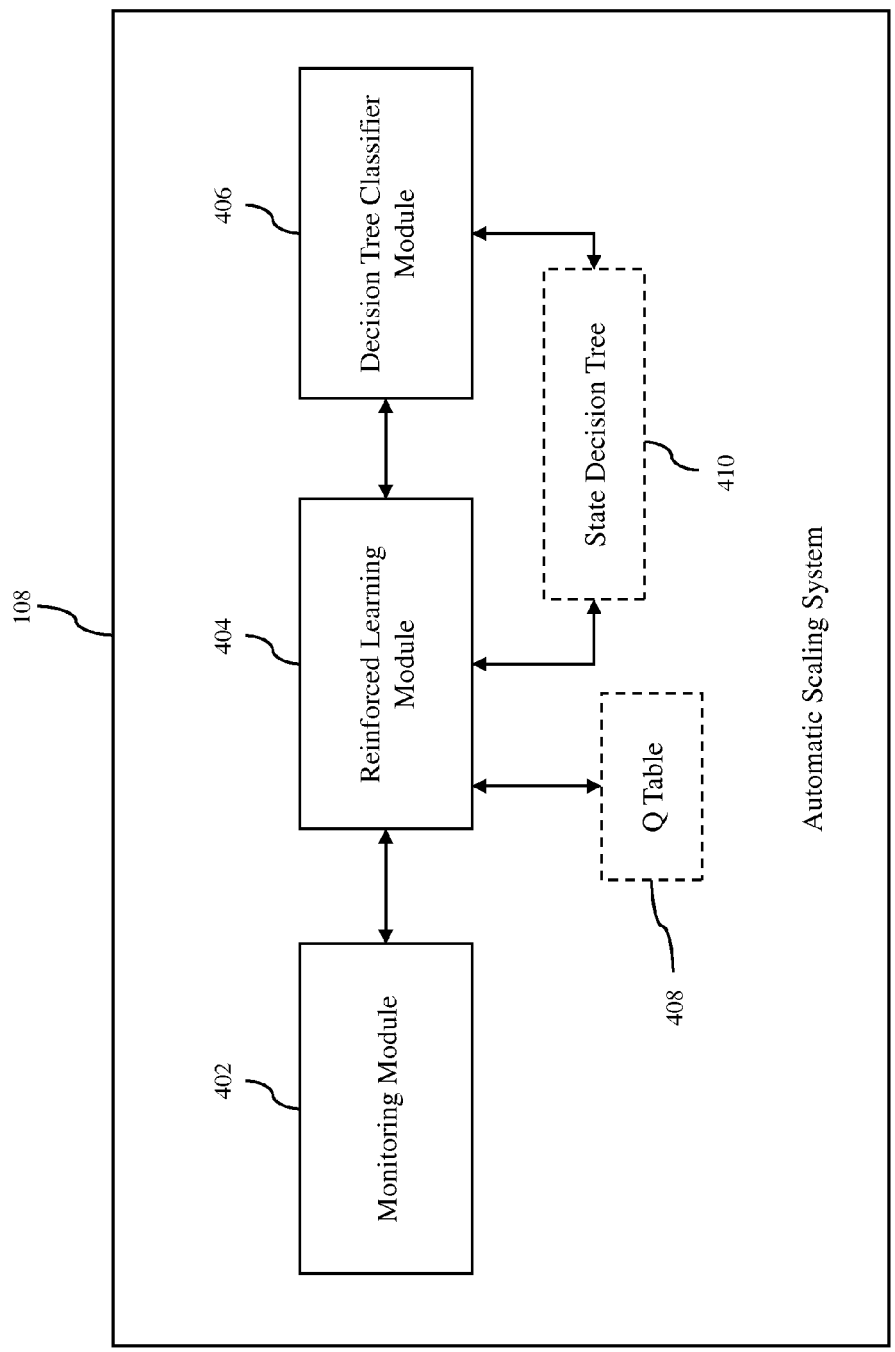
FIG. 4 is a block diagram illustrating components of an automatic scaling system in accordance with an embodiment of the invention.

Turing now to FIG. 4, components of the automatic scaling system 108 in accordance with an embodiment of the invention are illustrated. The automatic scaling system includes a monitoring module 402, a reinforced learning module 404 and a decision tree classifier module 406. These components of the automatic scaling system can be implemented as software, hardware or a combination of software and hardware. In some embodiments, at least some of these components of the automatic scaling system are implemented as one or more software programs running in one or more computer systems using one or more processors associated with the computer systems. These components may be reside in a single computer system or distributed among multiple computer systems.

The monitoring module 402 collects the operational metrics from the monitoring agents 236 of the various VM supporting a multi-tier application. The operational metrics may include resource utilization metrics and performance metrics with respect to the VMs supporting the multi-tier application. The operational metrics represent the current state of the multi-tier application, and thus, the operational metrics collected by the monitoring module may be viewed as state information of the multi-tier application. The operational metrics may be received from the monitoring agents on a periodic basis. The monitoring module gathers the received operational metrics and may store the data in a database. The monitoring module may format the received metric data so that the data can be readily used by the reinforced learning module 404 and the decision tree classifier module 406. In an embodiment, the monitoring module may be a Hyperic server.

The reinforced learning module 404 performs an auto scaling analysis on the multi-tier application based on a reinforced learning process to determine whether one or more tiers of the application should be scaled, i.e., increase or decrease the number of VMs operating at those tiers. The results of the autoscaling analysis is then used to add or delete VMs in one or more tiers of the application to properly scale the multi-tier application so that the application can run in an efficient manner. In an embodiment, the adding or deleting of VMs for one or more tiers of the multi-tier application is performed by other components of the management server 106.

As mentioned above, the autoscaling analysis performed by the reinforced learning module 404 uses a reinforced learning approach in order to make appropriate recommendations for proper scaling of the multi-tier application. The autoscaling analysis solves the problem of how to ensure that the multi-tier application operates at a desired performance level, e.g., satisfies a service level objective (SLO), by automatically scaling the VMs executing the multi-tier application in and out, while minimizing usage of resources. This autoscaling problem and its solution in accordance with embodiments of the invention are described below using notations in the following table.

| | |
|---|---|
| T | set of all tiers in the application. e.g., T = {web, app, db} |
| i | Index for control interval |
| $nvm_t^{limit}$ | Total number of VMs in Tier t at interval i, t ∈ T. |
| $\vec{u(i)}$ | resource configuration at interval i, |
| | e.g., $\vec{u(i)} = \{num_{web}^i, num_{app}^i, num_{db}^i\}$ |
| $\vec{y(i)}$ | application performance vector at interval i, |
| | e.g., $\vec{y(i)} = \{y_{web}^i, y_{app}^i, y_{db}^i\}$ |
| $y_{ref}$ | service level object for the application |
| s(i) | system state at interval i. s(i) = $\{\vec{u(i)}, \vec{y(i)}\}$ |
| a(i) | action at interval i. a(i) = (tier, num, out|in) |

For a multi-tier application, the resource configuration can be defined as $\vec{u_i}$, which is a vector that contains the number of VMs for all tiers, e.g., $\vec{u}=\{n_{web}, n_{app}, n_{db}\}$. For example, for an application with three tiers (T={web, app, db}), the configuration vector $\vec{u(i)}$ is defined as the resource configuration at interval i, which is a vector of total number of tiers t. In addition, a limit for the VMs is defined as $nvm_t^{limit}$, which determines the maximum total number of VMs at tier t the multi-tier application is allowed to consume. The application performance is represented as $\vec{y}(\iota)$, which is a vector of the individual tier performance $(y_t^i)$ (e.g. MySQL tier latency), that specifies the end-to-end performance of the multi-tier application at interval i. The state in this autoscaling (reinforced learning) problem can be represented as a combination of the current resource configuration and the application performance, which can be expressed as $s(i)=\{\vec{u}(\iota),\vec{y}(\iota)\}$. The input workload is not included in this formulation since the workload cannot be directly observed. However, the workload can be indirectly represented by the application performance $(\vec{y}(\iota))$. The actions in the autoscaling problem include either scaling out or in VMs in a particular tier represented by a(i)=(tier,num, out|in), where tier specifies the particular tier of the multi-tier application, num specifies the number of VMs to be scaled, out specifies whether one or more VMs should be added, and in specifies whether one or more VMs should be deleted.

The reinforced learning module 404 operates to perform reinforced learning operation, which involves an agent that automatically learns from an environment, using Q-learning model. The Q-learning model consists of the agent, states S of the environment and a set A of actions per state. By performing an action a∈A, the agent can move from state to state, where each state provides the agent a reward. The goal of the agent is to maximize its total reward. Normally, Q-learning uses a table to store the reward data. Therefore, this table maintains a function which calculates the reward of a state-action combination: Q: S×A→R, where S×A constitutes a product space. So, there are |S|×|A| possible situations, which need to be stored in the table with matching reward values. Thus, if a new state is defined by a very small change in attributes for states, the number of possible situations can expand rapidly and the table can quickly become intractable, which is referred to herein as large state space problem. As illustrated in FIG. 4, in an embodiment, the reinforced learning module uses a Q table 408 to store the reward data for each state-action combination. As described in detail below, the decision tree classifier module 406 resolves the large state space problem with respect to the Q table 408 using a decision tree classification technique where a state decision tree 410 with state nodes is created and modified in a manner that reduces the number of new states to consider for the reinforced learning.

The decision tree classifier module 406 operates to create and modify the state decision tree 410, which defines states of a multi-tier application that are used by the reinforced learning module 404. Each state of the multi-tier application includes multiple attributes that may be defined by numerical values. In an embodiment, which is described below, the states of the multi-tier application have two attributes, configuration attribute and performance attribute. However, in other embodiments, the states of the multi-tier application may have additional attributes.

In this embodiment, the decision tree classifier module 406 operates to reduce the number of possible states of the multi-tier application by categorizing states according to their attributes, e.g., configuration and performance. The decision tree classifier module groups similar states to a cluster or a node of the state decision tree 410. Whenever a new state is encountered, the decision tree classifier module tries to identify to which a subset of states the new state belongs before creating a new node or cluster in the state decision tree. In an embodiment, the decision tree classifier module uses a top-down induction of decision trees. In a decision tree, each non-leaf node splits the state space below into two subspaces. The splitting variable can be any variable in the attributes of the states in the multi-tier application, e.g., configuration $\vec{u}$ and performance $\vec{y}$. Each leaf node is a state cluster which contains one or more similar states. In an embodiment, the decision tree classifier module 406 places different states in the same cluster or node in the state decision tree that have the same values for one of the attributes and have similar values for one or more other attributes, e.g., the same configuration $\vec{u}$ and similar performance $\vec{y}$.

In an embodiment, when a new state is added to the decision tree structure, the decision tree classifier module 406 first checks if any of the existing clusters have the same values for a first attribute, e.g., configuration $\vec{u}$. If such cluster does not exist in the current state decision tree, a new cluster that contains only the new state is created and inserted into the decision tree. Otherwise, if such cluster can be found, the new state is then compared using values of a second attribute, e.g., performance $\vec{y}$, with the existing states in that cluster using a similarity measurement of the values of this attribute for the existing states in the cluster with the values of this attribute for the new state. In some embodiments, the similarity measurement involves analyzing the amount of change in a statistical measure of the values of this second attribute of the existing states in the cluster when the values of the corresponding attribute of the new state are added to the statistical measure. That is, a current statistical measure derived using the values of the second attribute of the existing states in the cluster is compared an updated statistical measure derived both the values of the second attribute of the existing states in the cluster and the values of the second attribute of the new state. The statistical measure can be, but not limited to, the average or the standard deviation. In an embodiment, if the addition of the new state does not make the statistical measure of the values of the second attribute in the existing cluster, e.g., the standard deviation of latencies $\vec{y}$, more than a threshold value, the new state is added to the existing cluster. The threshold value can be any value, and may be found empirically. Otherwise, a new cluster is created with only the new state and inserted into the state decision tree.

In one particular implementation, the decision tree classifier module 406 executes the following algorithm to add a new state to the current decision tree.

---

Algorithm 1: Add a new state to current decision tree

--- input : a new state s, decision tree root node root
1   if root = null then
2      | root ← makeCluster(s);
3      | return;
4   cur ← root;
5   while cur ≠ null and isLeaveNode(cur) = false do
6      | if satisfyCondition(cur)then;
7      |   | cur ← cur.leftChild;
8      | else
9      |   | cur ← cur.rigthtChild;
10  if cur ← null then
11     | newCluster ← makeCluster(s);
12     | if satisfyCondition(cur.parent) then
13     |   | cur.parent.rightChild ← newCluster;

-continued

Algorithm 1: Add a new state to current decision tree

```
14        |   else
15        |   | cur.parent.leftChild ← newCluster;
16        | return;
17        tierIndex ← hasSameConfig(cur,s);
18        if tierIndex = 0 then
19        | joinClusterWithSameConfig(cur,s);
20        else
21        | joinClusterWithDifferentConfig(cur,s,tierIndex);
22        return;
```

In algorithm 1, it takes two input parameters: a new state representation s and the root node of the decision tree root. If the root node is a null pointer, the algorithm creates a new cluster with only one state in it—the given state s (lines 1-3). The algorithm then find the leaf node to insert the given state s based on whether the conditions embedded in the decision node can be satisfied or not (lines 4-9). If such leaf node doesn't exist, the algorithm creates a cluster only with the given state s and inserts the newly created cluster as the child of the parent node (lines 10-16). However, if such leaf node exists, the algorithm first computes whether the leaf node and given state s share the same configuration. If they do, the algorithm calls the function joinClusterWithSameConfig to insert state s into the leaf node. Otherwise, it calls the function joinClusterWithDifferentConfig to create a new decision node and insert state s (lines 17-21).

In this particular implementation, the following algorithm is used for the joinClusterWithDifferentConfig function.

Algorithm 2: joinClusterWithDifferentConfig

```
input : state s, cluster node cluster, tier index of different configuration index
1    newCluster ← makeCluster(s);
2    clusterVal ← getCfgVal(cluster,index);
3    stateVal ← getCfgVal(s,index);
4    if clusterVal > stateVal then
5        | newNode ←
             makeConfigureDecisionNode(index,"≥",clusterVal);
6        | newNode.rightChild ← cluster;
7        | newNode.leftChild ← newcluster;
8    else
9        | newNode ←
             makeConfigureDecisionNode(index,"≥",stateVal);
10       | newNode.rightChild ← newcluster;
11       | newNode.leftChild ← cluster;
12   if satisfyCondition(cluster.parent) then
13       | cluster.parent.rightChild ← newNode;
14       | cluster.parent ← newNode;
15   else
16       | cluster.parent.leftChild ← newCluster;
17       | cluster.parent ← newCluster;
18   return;
```

In algorithm 2, it takes three parameters: a new state s, a cluster node cluster, and a tier index number index to specify which tier has the different configuration. The algorithm first creates a new cluster newCluster with the state s and it then gets both configuration values of the cluster and state s for the tier specified by index (lines 1-3). If the cluster configuration value 'clusterVal' is greater or equal than the state value 'stateVal', the algorithm creates a new non-leaf node with the condition that "the number of VMs in index tier>=clusterVal". Then it adds cluster as the right child and newCluster as the left child (lines 4-7). Otherwise, if the cluster configuration value 'clusterVal' is less than the state value 'stateVal', the algorithm creates a new non-leaf node with the condition that "the number of VMs in index tier>=stateVal". Then it adds newCluster as the right child and cluster as the left child (lines 9-11). Finally, it updates the parent and child pointers accordingly (lines 12-18).

In this particular implementation, the following algorithm is used for the joinClusterWithSameConfig function.

Algorithm 3: joinClusterWithSameConfig

```
input : state s, cluster node cluster
1    preStd ← getStandardDeviation(cluster);
2    curStd ← getStandardDeviation(cluster,s);
3    if curStad - preStd ≤ threshold then
4        | addstate (cluster,s);
5        | return;
6    numOfTier ← getNumOfTiers( );
7    newCluster ← makeCluster(s);
8    for i ← 1 to numOfTiers do
9        | mean ← getMean(cluster,i);
10       | stateVal ← getPerfVal(cluster,i);
11       | if stateVal ≥ mean then;
12       | | newNode(i) ← makePerfDecisionNode(i,"≥",mean);
13       | else
14       | | newNode(i) ← makePerfDecisionNode(i," < ",mean);
15       | if i ≥ 2 then;
16       | | newNode(i - 1).rightChild ← newNode(i);
17       | newNode(i)leftChild ← cluster;
18   if satisfyCondition(cluster.parent) then
19       | cluster.parent.rightChild ← newNode(1);
20   else
21       | cluster.parent.leftChild ← newNode(1);
22   cluster.parent ← newNode(1);
23       return;
```

In algorithm 3, it takes two parameters: a new state s and a cluster node cluster. The algorithm computes the standard deviation for the states in the cluster preStd and the standard deviation curStd if the state s were inserted into this cluster. If the difference between preStd and curStd is less than or equal to the threshold, the algorithm inserts state s into the cluster (lines 1-5). However, if the difference is larger than threshold, the algorithm creates a new cluster with the state s (line 6). Then for each application tier, it computes the mean performance value mean for the tier and compares it with the performance value stateVal of the same tier in state s (lines 7-11). The algorithm creates a new decision node with the condition saying that "the performance in i tier>= or (<) mean" based on the relationship of mean and stateVal (lines 11-14). The new decision nodes are connected together (line 15-16) and the cluster is set to be the common left child of these nodes (line 17). Finally, it updates the parent and child pointers accordingly (lines 18-22).

Figure 5A:
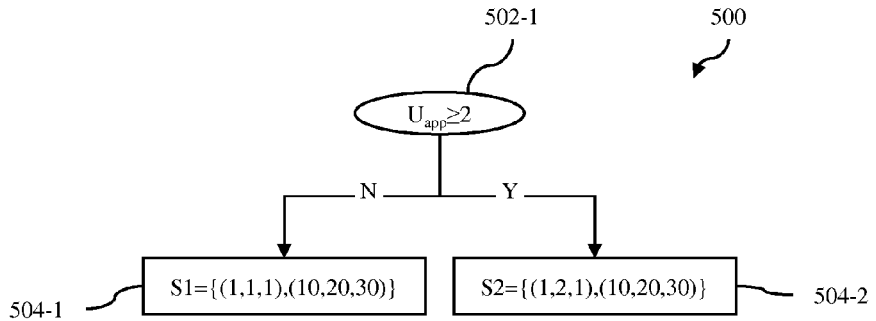
FIGS. 5A-5D are illustrate the operation of a decision tree classifier module of the automatic scaling system to add new states into a state decision tree in accordance with an embodiment of the invention.
Figure 5B:
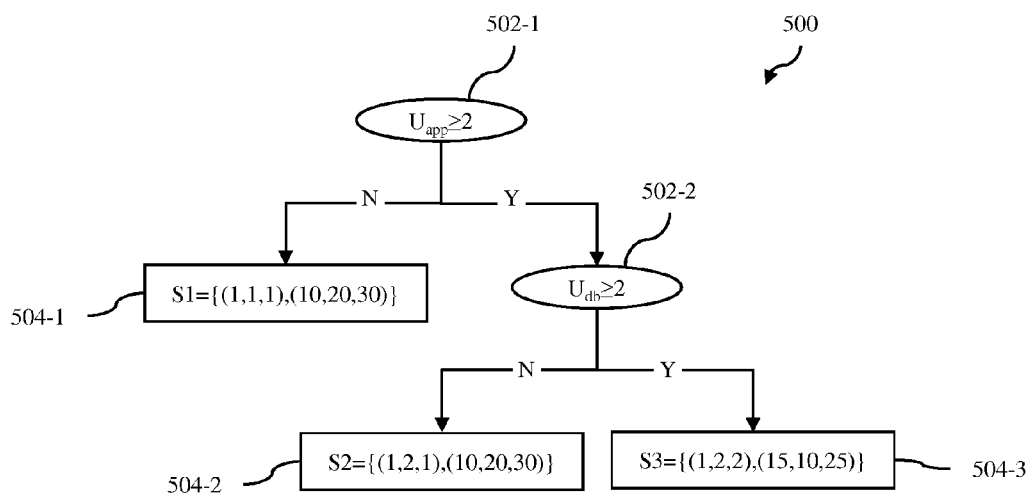
Figure 5C:
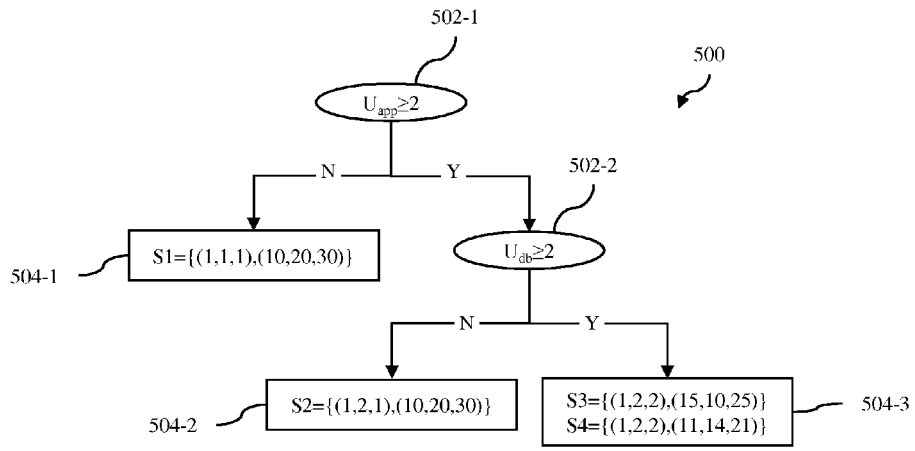
Figure 5D:
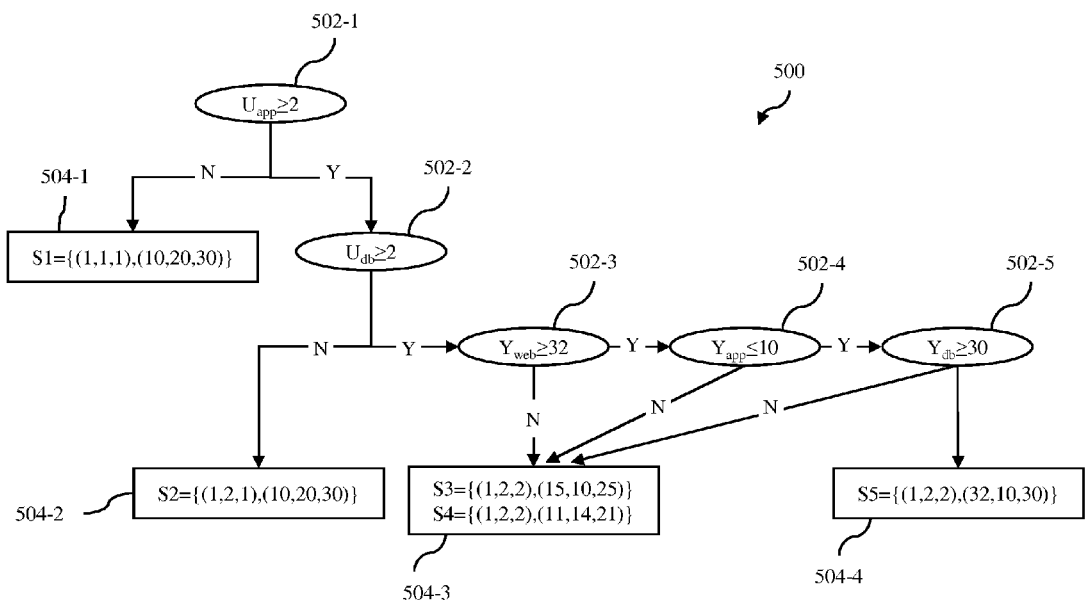

The operation of the decision tree classifier module 406 in accordance with an embodiment of the invention is further described using an example illustrated in FIGS. 5A-5D. In this example, the states of a multi-tier application include only two attributes, configuration $\vec{u}$ and similar performance $\vec{y}$. As shown in FIG. 5A, a state decision tree 500 initially has a decision node 502-1 and two clusters or nodes 504-1 and 504-2, each containing a single cluster state, as shown in FIG. 5A. The cluster 504-1 contains a cluster state S1, while the cluster 504-2 contains a cluster state S2. The decision node 502-1 includes a decision condition of whether the configuration value for the application tier, $U_{app}$, i.e., the number of VMs in the application tier, is greater than or equal to two (2). Then, a new state S3 is introduced to the decision tree classifier module 406. However, the new state S3 does not have the same configuration of any of the existing cluster states. Thus, the new state S3 causes a new cluster 504-3 containing the new state S3 to be created in the decision tree, as shown in FIG. 5B. Since $U_{app}$ of new state S3 is greater than or equal to two (2), the new state S3 belongs on the right branch from the decision node 502-1. The configuration difference between the state S2 and the new state S3 is the configuration value for the database tier, $U_{db}$. Thus, a new decision node 502-2 is created. The decision node 502-2 includes a decision condition of whether the configuration value for the database tier, $U_{db}$, i.e., the number of VMs in the database tier, is greater than equal to two (2). When another new state S4 having the same configuration as the state S3 is encountered, this new state S4 is merged into the cluster 504-3, as shown in FIG. 5C. The new state S4 does not change the standard deviation of the cluster 504-3 to be greater than a threshold value. However, when another new state S5 having the same configuration as the states S3 and S4 is encountered, a new cluster 504-4 is created with only the new state S5 and inserted into the decision tree, as shown in FIG. 5D. In this instance, the addition of the new state S5 into the cluster 504-3 changes the standard deviation of the cluster 504-3 to be greater than the threshold value, and thus, the new state S5 cannot be merged into the cluster 504-3.

In some embodiments, when there are more than one state in a single cluster or node, the states may be merged to create a single node. Thus, the attribute values of the states that are different, e.g., the performance values, are merged using k-median. Using k-median values are preferred over using k-mean values since k-mean values may results in values not yet seen in a state.

If the states of a multi-tier application have more than two attributes, a similar approach for the second attribute, e.g., performance attribute, may be used for any additional attributes to determine whether a new state should be added to an existing node or cluster in a state decision tree or whether a new node or cluster containing only that new state should be created in the state decision tree. Thus, the embodiments of the invention can be applied to application states that have any number of attributes.

Figure 6:
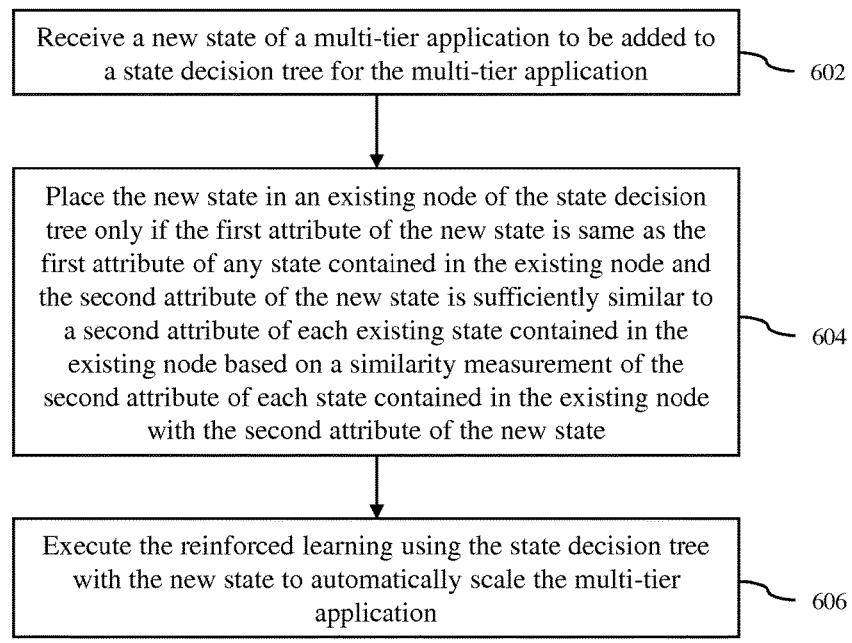
FIG. 6 is a flow diagram of a method for reducing state space in reinforced learning for automatic scaling of a multi-tier application in accordance with an embodiment of the invention.

A method for reducing state space in reinforced learning for automatic scaling of a multi-tier application in accordance with an embodiment of the invention is now described with reference to the process flow diagram of FIG. 6. At block 602, a new state of the multi-tier application to be added to a state decision tree for the multi-tier application is received. The new state includes a first attribute and a second attribute. In some embodiments, the new state is collected in the form of state information by the monitoring module 402 of the automatic scaling system 108. At block 604, the new state is placed in an existing node of the state decision tree only if the first attribute of the new state is same as the first attribute of any state contained in the existing node and the second attribute of the new state is sufficiently similar to a second attribute of each existing state contained in the existing node based on a similarity measurement of the second attribute of each state contained in the existing node with the second attribute of the new state. In some embodiments, the similarity measurement is based on a statistical measure of values of the second attribute of each existing state contained in the existing node and/or values of the second attribute of the new state. At block 606, the reinforced learning is executed using the state decision tree with the new state to automatically scale the multi-tier application.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for reducing state space in reinforced learning for automatic scaling of a multi-tier application, the method comprising:
   receiving a new state of the multi-tier application to be added to a state decision tree for the multi-tier application, the new state including a first attribute and a second attribute;
   placing the new state in an existing node of the state decision tree only if the first attribute of the new state is same as the first attribute of any state contained in the existing node and a difference between a current statistical measure of values of the second attribute of each existing state contained in the existing node and a new statistical measure of the values of the second attribute of each existing state contained in the existing node with the values of the second attribute of the new state does not exceed a threshold to reduce a number of new states to consider for the reinforced learning; and
   executing the reinforced learning using the state decision tree with the new state to automatically scale the multi-tier application.

2. The method of claim 1, further comprising:
receiving another new state of the multi-tier application to be added to the state decision tree for the multi-tier application; and
placing the another new state in a new node in the state decision tree only if a first attribute of the another new state differs from a first attribute of each state included in the state decision tree.

3. The method of claim 1, further comprising:
receiving another new state of the multi-tier application to be added to the state decision tree for the multi-tier application, the another new state having a first attribute that is same as a first attribute of a state in a node of the state decision tree;
placing the another new state in a new node of the state decision tree only if a difference between another current statistical measure of values of the second attribute of each existing state contained in the node and a new statistical measure of the values of the second attribute of each existing state contained in the node with the values of the second attribute of the another new state does not exceed the threshold.

4. The method of claim 1, wherein the current statistical measure is an average of the values of the second attribute of each existing state contained in the existing node and the new statistical measure is an average of the values of the second attribute of each existing state contained in the existing node with the values of the second attribute of the new state.

5. The method of claim 1, wherein the current statistical measure is a standard deviation of the values of the second attribute of each existing state contained in the existing node and the new statistical measure is a standard deviation of the values of the second attribute of each existing state contained in the existing node with the values of the second attribute of the new state.

6. The method of claim 1, wherein the first attribute of the new state of the multi-tier application includes numbers of virtual machines running in different tiers of the multi-tier application.

7. The method of claim 6, wherein the second attribute of the new state of the multi-tier application includes performance measures for the different tiers of the multi-tier application.

8. The method of claim 7, wherein the performance measures for the different tiers of the multi-tier application include performance latencies of the different tiers of the multi-tier application.

9. The method of claim 1, wherein executing the reinforced learning using the state decision tree with the new state to automatically scale the multi-tier application comprises executing the reinforced learning using the state decision tree with the new state to automatically scale the multi-tier application by adding or deleting one or more virtual machines executing the multi-tier application.

10. A non-transitory computer-readable storage medium containing program instructions for a method for reducing state space in reinforced learning for automatic scaling of a multi-tier application, wherein execution of the program instructions by one or more processors of a computer system causes the one or more processors to perform steps comprising:
receiving a new state of the multi-tier application to be added to a state decision tree for the multi-tier application, the new state including a first attribute and a second attribute;
placing the new state in an existing node of the state decision tree only if the first attribute of the new state is same as the first attribute of any state contained in the existing node and a difference between a current statistical measure of values of the second attribute of each existing state contained in the existing node and a new statistical measure of the values of the second attribute of each existing state contained in the existing node with the values of the second attribute of the new state does not exceed a threshold to reduce a number of new states to consider for the reinforced learning; and
executing the reinforced learning using the state decision tree with the new state to automatically scale the multi-tier application.

11. The computer-readable storage medium of claim 10, wherein the steps further comprise:
receiving another new state of the multi-tier application to be added to the state decision tree for the multi-tier application; and
placing the another new state in a new node in the state decision tree only if a first attribute of the another new state differs from a first attribute of each state included in the state decision tree.

12. The computer-readable storage medium of claim 10, wherein the steps further comprise:
receiving another new state of the multi-tier application to be added to the state decision tree for the multi-tier application, the another new state having a first attribute that is same as a first attribute of a state in a node of the state decision tree;
placing the another new state in a new node of the state decision tree only if a difference between another current statistical measure of values of the second attribute of each existing state contained in the node and a new statistical measure of the values of the second attribute of each existing state contained in the node with the values of the second attribute of the another new state does not exceed the threshold.

13. The computer-readable storage medium of claim 10, wherein the current statistical measure is an average of the values of the second attribute of each existing state contained in the existing node and the new statistical measure is an average of the values of the second attribute of each existing state contained in the existing node with the values of the second attribute of the new state.

14. The computer-readable storage medium of claim 10, wherein the current statistical measure is a standard deviation of the values of the second attribute of each existing state contained in the existing node and the new statistical measure is a standard deviation of the values of the second attribute of each existing state contained in the existing node with the values of the second attribute of the new state.

15. The computer-readable storage medium of claim 10, wherein the first attribute of the new state of the multi-tier application includes numbers of virtual machines running in different tiers of the multi-tier application.

16. The computer-readable storage medium of claim 15, wherein the second attribute of the new state of the multi-tier application includes performance measures for the different tiers of the multi-tier application.

17. The computer-readable storage medium of claim 16, wherein the performance measures for the different tiers of the multi-tier application include performance latencies of the different tiers of the multi-tier application.

18. A management server for automatic scaling of a multi-tier application supported by hardware in a distributed computer system comprising:

memory; and at least one processor configured to:

receive a new state of the multi-tier application to be added to a state decision tree for the multi-tier application, the new state including a first attribute and a second attribute;

placing the new state in an existing node of the state decision tree only if the first attribute of the new state is same as the first attribute of any state contained in the existing node and a difference between a current statistical measure of values of the second attribute of each existing state contained in the existing node and a new statistical measure of the values of the second attribute of each existing state contained in the existing node with the values of the second attribute of the new state does not exceed a threshold to reduce a number of new states to consider for the reinforced learning; and executing the reinforced learning using the state decision tree with the new state to automatically scale the multi-tier application.

19. The management server of claim 18, wherein the at least one processor is further configured to:

receive another new state of the multi-tier application to be added to the state decision tree for the multi-tier application; and place the another new state in a new node in the state decision tree only if a first attribute of the another new state differs from a first attribute of each state included in the state decision tree.

20. The management server of claim 18, wherein the at least one processor is further configured to:

receive another new state of the multi-tier application to be added to the state decision tree for the multi-tier application, the another new state having a first attribute that is same as a first attribute of a state in a node of the state decision tree;

place the another new state in a new node of the state decision tree only if a difference between another current statistical measure of values of the second attribute of each existing state contained in the node and a new statistical measure of the values of the second attribute of each existing state contained in the node with the values of the second attribute of the another new state does not exceed the threshold.

21. The management server of claim 18, wherein the current statistical measure is a standard deviation of the values of the second attribute of each existing state contained in the existing node and the new statistical measure is a standard deviation of the values of the second attribute of each existing state contained in the existing node with the values of the second attribute of the new state.

22. The management server of claim 18, wherein the first attribute of the new state of the multi-tier application includes numbers of virtual machines running in different tiers of the multi-tier application, and wherein the second attribute of the new state of the multi-tier application includes performance measures for the different tiers of the multi-tier application.

* * * * *